(12) United States Patent
Caruana et al.

(10) Patent No.: US 10,146,967 B2
(45) Date of Patent: Dec. 4, 2018

(54) CONTACTLESS COMMUNICATION METHOD WITH NEGATIVE MODULATION

(75) Inventors: Jean-Paul Caruana, La Seyne sur Mer (FR); Grégory Capomaggio, Roquevaire (FR); Christophe Buton, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/126,114

(22) PCT Filed: Jun. 15, 2012

(86) PCT No.: PCT/EP2012/061526
§ 371 (c)(1),
(2), (4) Date: Feb. 21, 2014

(87) PCT Pub. No.: WO2012/172092
PCT Pub. Date: Dec. 20, 2012

(65) Prior Publication Data
US 2014/0159870 A1    Jun. 12, 2014

(30) Foreign Application Priority Data
Jun. 16, 2011    (EP) .................................... 11305753

(51) Int. Cl.
*G06K 7/10*    (2006.01)
*G06K 7/00*    (2006.01)
(Continued)

(52) U.S. Cl.
CPC ....... *G06K 7/10009* (2013.01); *G06K 7/0008* (2013.01); *G06K 19/0723* (2013.01); *H04L 27/02* (2013.01); *H04L 27/04* (2013.01)

(58) Field of Classification Search
USPC ................ 375/260, 261, 267, 268, 279–282, 375/298–300, 308, 320, 329–333, 347,
(Continued)

(56) References Cited

U.S. PATENT DOCUMENTS

| 3,974,460 A | * | 8/1976 | Hongu | ..................... H03C 1/36 331/116 R |
| 5,317,330 A | * | 5/1994 | Everett | ................. G01S 13/753 340/572.7 |

(Continued)

FOREIGN PATENT DOCUMENTS

| EP | 1 043 680 A1 | 10/2000 |
| EP | 1 801 741 B1 | 7/2009 |

(Continued)

OTHER PUBLICATIONS

Finkenzeller, RFID Handbook: Fundamentals and Applications in Contactless Smart Cards, Radio Frequency Identification and Near-Field Communication, 2010, Wiley, Third Edition, pp. 43-45 and 187-188.*

(Continued)

*Primary Examiner* — Laura Nguyen
(74) *Attorney, Agent, or Firm* — Buchanan Ingersoll & Rooney PC (57) ABSTRACT

The present invention concerns a method of radio-frequency communication between a contactless transponder and a reader, in which at least one sideband of the carrier frequency is used for communicating a response from the transponder by modulation of the amplitude of this carrier frequency. The method is distinguished in that the modulation at least partly applies a modulation level greater than 100%, which causes a negative modulation. The invention also concerns a corresponding communication circuit.

24 Claims, 8 Drawing Sheets

(51) Int. Cl.
  *G06K 19/07* (2006.01)
  *H04L 27/04* (2006.01)
  *H04L 27/02* (2006.01)
(58) Field of Classification Search
  USPC ........................................................ 375/353
  See application file for complete search history.

(56) References Cited

U.S. PATENT DOCUMENTS

| | | | |
|---|---|---|---|
| 6,547,149 | B1 | 4/2003 | Wuidart et al. |
| 6,567,394 | B1* | 5/2003 | Arisawa ............. G06K 19/0723 332/170 |
| 6,837,438 | B1* | 1/2005 | Takasugi ............ G06K 19/0723 235/492 |
| 2005/0213675 | A1* | 9/2005 | Wei ....................... H04L 25/497 375/259 |
| 2006/0017498 | A1* | 1/2006 | Kuhn ................... H03D 1/2254 329/347 |
| 2006/0244568 | A1* | 11/2006 | Tong ........................ H04Q 9/00 340/10.41 |
| 2008/0137774 | A1 | 6/2008 | Kim et al. |
| 2010/0224682 | A1* | 9/2010 | Busch-Sorensen .......................... H04L 9/3278 235/380 |
| 2011/0080152 | A1* | 4/2011 | Luzzi ................. G06K 19/0723 323/299 |
| 2011/0193687 | A1* | 8/2011 | Hirata .................. G06K 7/0008 340/10.4 |
| 2011/0215158 | A1* | 9/2011 | Kargl ..................... H04L 27/04 235/492 |
| 2012/0146784 | A1* | 6/2012 | Hines ................. A41D 13/1281 340/539.11 |

FOREIGN PATENT DOCUMENTS

JP 11-074938 A 3/1999
KR 10-2007-0034415 A 3/2007

OTHER PUBLICATIONS

International Search Report (PCT/ISA/210) dated Nov. 21, 2012, by the European Patent Office as the International Searching Authority for International Application No. PCT/EP2012/061526.
Written Opinion (PCT/ISA/237) dated Nov. 21, 2012, by the European Patent Office as the International Searching Authority for International Application No. PCT/EP2012/061526.

* cited by examiner

CONTACTLESS COMMUNICATION METHOD WITH NEGATIVE MODULATION

FIELD OF THE INVENTION

The invention concerns a radio-frequency communication method in which a radio-frequency transponder object communicates by modulation of the amplitude of a carrier frequency.

It concerns in particular a radio-frequency method in which said transponder object generates a signal modulating the carrier frequency at a subcarrier frequency. This modulation results in the creation of at least one high- and/or low-frequency sideband detected by a reader.

The invention finds an application in an activated contactless communication method and in an implementation circuit and device. It aims in particular to specify the characteristics of the signals and antennas as well as the principle of this novel way of using contactless technology. Radio-frequency communication is in principle of short range and effected by lower electromagnetic induction and coupling with a range of around 0.01 or even approximately 1 m.

The circuits and device to which the invention relates can be included in portable electronic objects for example memory cards such as of the SD type (from the company Sandisk). Such cards are currently used in a mobile telephone card interface for effecting a transaction of the contactless type complying in particular with ISO/IEC 14443 or 15693, since these telephones have no contactless interface on leaving the factory.

The invention also relates to devices having an NFC function such as mobile phones.

PRIOR ART

A modulation signal, modulating at the rate of a subcarrier frequency, can define several successive periods corresponding to an encoding of the information to be communicated. These subcarrier periods in principle generate at least one carrier-frequency sideband that is detected by a reader during a communication.

In a particular field of the invention relating to radio-frequency communications according to ISO/IEC 14443 or equivalent, the modulation functions as below. Within periods of the modulation signals referred to previously, the amplitude of the carrier frequency is substantially non-attenuated by the modulation signal, in principle during a half-period, while during the other complementary half-period the amplitude of the carrier frequency is in principle substantially or even completely attenuated by the modulation signal.

Current ISO/IEC 14443 and NFC (the acronym for near field communication) technology is based on a principle of retro-modulation of a signal emitted by a reader.

According to this principle, a certain quantity of electromagnetic field supplied by a reader must be modulated by the object with a proximity contactless chip, also referred to as a PICC (the acronym for Proximity Integrated Circuit Card). In order to be in conformity with the sensitivity of the reader, a minimum field amplitude is required to be modulated by the object. This modulation of the reader carrier must generate two sidebands with a amplitude at least equal to $22/H^{0.5}$. To fulfil this condition, it is necessary to have a minimum coupling between the reader and the object in order to generate sufficient retro-modulation signal. The coupling effect is directly dependent on the surfaces of the antenna of the reader and that of the contactless object.

In the case of a very small contactless object, for example for a SD microcard or an object with a substantially equivalent surface, the surface of the radio-frequency antenna is radically too small. In addition, this type of object is intended to be incorporated in a host device such as a mobile telephone. The latter operation further reduces the coupling of the contactless object with the reader because of the metal environment of the telephone.

In particular, a communication used between a contactless card called a PICC and a contactless reader called a PCD (the acronym for Proximity Coupling Device) is based on the principle of a modulation of the amplitude of the magnetic field generated by the PCD. The latter in return detects the variations in this amplitude and decodes therefrom the message produced by the PICC.

Because of the very fact of this communication principle, in particular because the field is emitted by the reader, the resulting modulation rate is between 0 and 100%.

Figure 1:
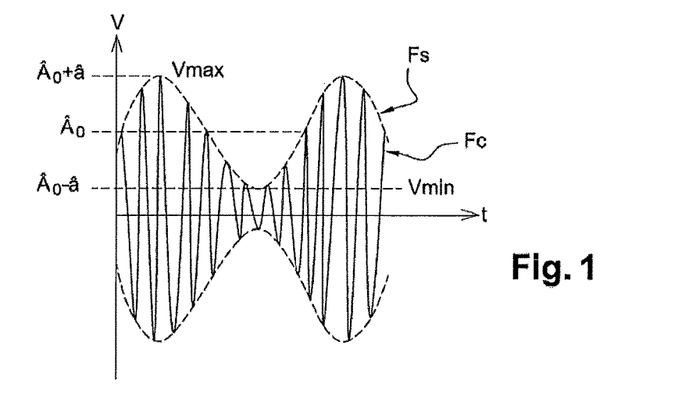
FIG. 1 illustrates the form of a modulating signal of the prior art described in the preamble of the application.

This is because the amplitude modulation operation consists of modifying the amplitude of the magnetic field produced by the reader at a frequency Fc=13.56 MHz according to that of the Fs wave or a modulating signal corresponding to the PICC message. The form of the modulating signal is thus presented in the diagram illustrated in FIG. 1.

The expression of the amplitude modulated signal AM can be written in the form:

$$h(t) = [\hat{A}_0 + m(t)]\cos(\omega_0 t) = \hat{A}_0 \cos(\omega_0 t) \cdot \left[1 + \frac{a}{\hat{A}_0}\cos\omega t\right]$$

"k" represents the modulation rate and is expressed by $$k = \frac{\hat{a}}{\hat{A}_0} = \frac{a}{A_0}$$

Figure 2:
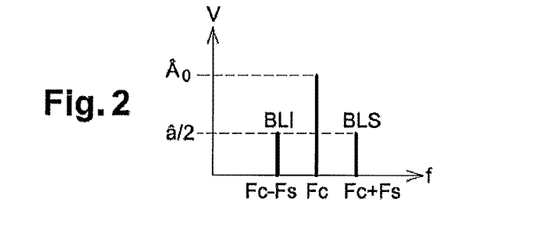
FIG. 2 illustrates the spectrum of the modulating signal corresponding to FIG. 1.

A simple operation on the expression h(t) makes it possible to write this as the sum of sinusoidal functions. It is therefore possible to depict in FIG. 2 the spectrum of the signal in the form of three lines: the centre line Fc referred to as "carrier" and two lateral lines Fc−Fs and Fc+Fs, characterising the modulating signal illustrated.

The way of expressing the ability of a PICC radio-frequency transponder to reply to a PCD reader is based on a spectral analysis by the PCD of the field thus modulated.

The amplitude of the two sidebands LSB (lower sideband) and HSB (higher sideband) is standardised through the texts of ISO/IEC 14443. This quantity forms part of the test criteria of contactless transponders, verified during the performance of measurements as described in the test standard ISO/IEC 10373-6.

In the communications of proximity contactless transponders, the frequency of the carrier referred to here as (Fc) is standardised. Its value is 13.56 MHz. The low-frequency modulating signal is a binary signal representing a subcarrier of frequency Fc/16, substantially equal to 847 kHz. This subcarrier is referred in the rest of the document as Fs. The subcarrier Fs is used in two different ways for coding the binary message. These ways are referred to as type A and type B in the contactless proximity standard.

The communication distance of this type of transponder is an important criterion for certain applications. An acceptable distance may be difficult or even impossible to achieve in cases where the surface area of the antenna is small. The size of the antenna of the transponder is in fact a key element in the communication distances from PCD readers to PICC objects.

It is a well known case with certain so-called "NFC" telephones, but even more so when the transponder and its antenna must be integrated in a very small object such as a memory card of the μSD type. In this type of object, the size of the antenna does not allow passive communication between the transponder and the contactless reader.

In this type of very small product, the use of an activated modulation using a local supply source (with respect to the object) makes it possible to obtain a communication distance that is sometimes acceptable despite the very small format.

The patent EP 1801741 (B1) describes a method of generating an inherent electromagnetic field by a portable data carrier (transponder), in which the transmission of data to a reader takes place in an activated communication mode and in which the inherent electromagnetic field transmission of the object is seen by the reader as a modulation of the field of the reader. However, this solution appears not to be described completely or not to function correctly as described.

The patent applications of the applicant EP 11305453.0 and EP 11305454.8 are incorporated here in particular with regard to the description of the methods of implementing activated communication and arrangement of antennas.

By this modulation, at least one or in principle two sidebands appear respectively situated at Fc−Fs and Fc+Fs. The amplitude of the sidebands is in principle limited to half the maximum amplitude of the carrier frequency.

The objective of the invention is to improve the radio-frequency communication of the objects referred to above.

SUMMARY OF THE INVENTION

In its principle, the invention, against all expectations, manages an improvement of the communication by increasing the amplitude of the modulation generated by a contactless object. In other words, the invention proposes a method of modulating the local carrier of the radio-frequency transponder that increases the amplitude of the sidebands with respect to that of the carrier; for the record, in the prior art this amplitude was limited to 50% of the amplitude of the carrier frequency of the reader captured by the PICC antenna.

According to the principle of the method, the signal modulating the PICC transponder (or any device emulating a radio-frequency transponder) causes a variation in the amplitude of the local carrier of the PICC that is between 0 and 200% of its maximum limit value referred to above. The method of the invention uses an over-modulation (or negative modulation), the modulation rate being greater than 100%.

In the application to an activated communication, the invention proposes to generate, independently of the reader, at least one of the two sidebands so that the reader can detect the retro-modulation signal coming from a contactless object (PICC). The communication circuit returns a carrier signal modulated by the response signal by load modulation of the contactless object; preferably, the modulation of this carrier signal can be amplified in order to supply an emission antenna.

To this end, the subject matter of the invention is therefore a method of communication between a contactless transponder and a reader, in which at least one sideband of the carrier frequency is used for communicating a response from the transponder by modulation of the amplitude of this carrier frequency; the method is distinguished in that the modulation at least applies a modulation rate greater than 100%, which causes a negative modulation.

According to other features of the method,
the method uses a step of generation or extraction of the carrier frequency by the portable object, said frequency being synchronous with the interrogation frequency of the reader, and use of said negative modulation taking place during at least a part of a modulation half-cycle part;
said transponder object generates a modulation signal timed at a subcarrier frequency, said modulation generating at least one of said sidebands;
said modulation signal comprises at least one period (cycle) or a plurality, the application of this modulation signal causing:
an amplitude modulation with a rate close to zero, during a first part of a first modulation signal half-cycle,
a negative or equivalent amplitude modulation with a rate greater than 100% and less than or equal to 200%, during a second part of a second half-cycle opposite to said first modulation signal half-cycle;
the negative modulation also generates a phase difference of the carrier frequency greater than 0° and substantially less than or equal to 180°;
the rate of said negative modulation is substantially equal to 200% and the phase difference substantially equal to 180°.

Another subject matter of the invention is a contactless communication circuit corresponding to the method according to claims 7 to 15. The contactless communication circuit is considered to generate at least one sideband of the carrier frequency and to use it to communicate a response from the transponder by modulation of the amplitude of this carrier frequency. The circuit is distinguished in that it is configured so as to at least partly apply the modulation with a modulation rate greater than 100%, which causes a negative modulation (MOD B).

The benefits afforded by the invention are great. The operating distances between the PCD reader and the PICC transponder object are greatly increased. By virtue of this negative modulation, the amplitude of the response of the PICC portable object being able to be doubled, the invention has the advantage of achieving communication distances much greater than those previously enabled.

The invention also makes it possible to very greatly reduce the size of the antenna of the PICC portable object while maintaining a large communication distance.

In addition, the invention makes it possible to reduce the current to be applied to the transponder object in order to respond with an amplitude in accordance with the requirements of the standards.

The invention is particularly, but not exclusively, suited to micro-SD cards of the contactless type. By virtue of the invention good coupling is achieved between a reader and an object of the PICC type (SD card). In addition, it is easy to implement with a minimum modification. The invention applies in particular to any normal dual-interface chip.

BRIEF DESCRIPTION OF THE FIGURES

Figure 3:
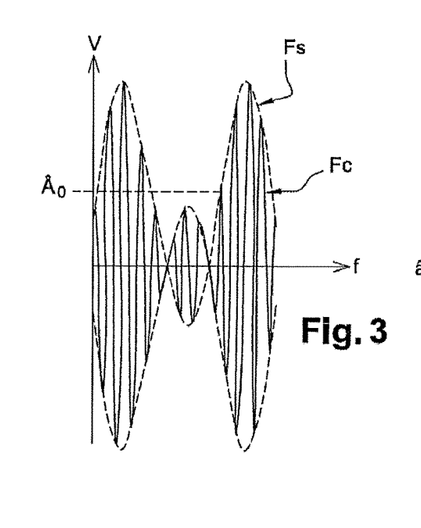
FIGS. 3 and 4 illustrate the application of the negative modulation principle to radio-frequency communications between a portable object and a reader according to the invention.
Figure 4:
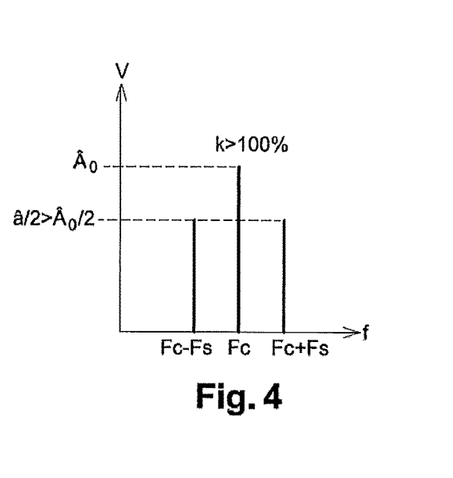

FIGS. 3 and 4 illustrate a method of communication between a contactless transponder and a reader based on a carrier-frequency modulation Fc. To communicate a response from the transponder, the method uses at least one sideband of the carrier frequency (Fc+Fs) resulting from an amplitude modulation of this carrier frequency.

According to one feature of the invention, the modulation at least partly applies a modulation rate greater than 100%, which causes a negative modulation.

FIG. 4 illustrates the negative-modulation principle used judiciously by the invention in the application to radio-frequency transponder objects communicating by electromagnetic coupling with a reader. It is a case here in the example of an over-modulation in which the modulation is greater than 100%.

This figure shows upper and lower curves delimiting a modulation envelope Fs of a carrier frequency Fc disposed inside the envelope. The lower and upper curves intersect in a part corresponding to a second half cycle and consequently the sidebands are amplified as illustrated in the figure at a value â/2 greater than the value Âo/2 generally obtained in the prior art.

The transponder object generates a response by means of a modulation signal that is timed at a carrier frequency. The carrier frequency conveys the response from the transponder. The modulation signal applied to the carrier frequency thus generates at least one of said sidebands that will be detected by the reader; these sidebands are functions of the frequency of this subcarrier.

Figure 5:
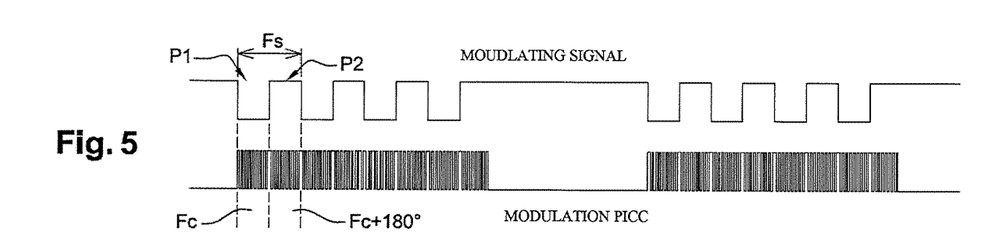
FIGS. 5 and 6 illustrate the respectively modulating and modulated signals resulting from the application of the above principle to communications of type A or B according to ISO/IEC 14443 or 18092 or 21481.
Figure 6:
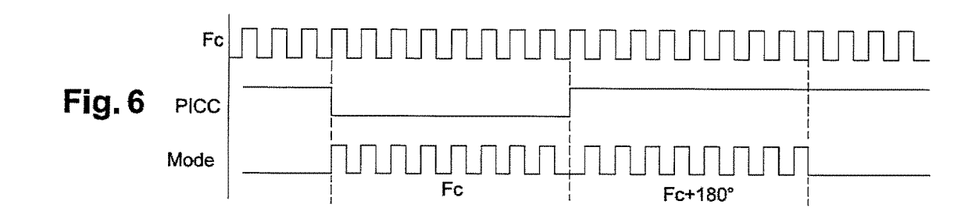

More particularly FIGS. 5 and 6 illustrate the principle of negative modulation (or greater than 100%) applied to near-field contactless communications of type A and/or type B, as described in ISO/IEC 14443, ISO/EC 18092 or ISO/IEC 21481, also known by the abbreviation NFC ("Near field communication").

According to one embodiment, the method of the invention comprises the following steps for effecting the amplitude modulation by means of a modulation signal. The modulation signal comprises at least one period or a plurality.

In the application to the above standards, the modulating signal comprises four periods of alternating signals having binary form defining high or low levels, followed by an absence of half-cycle for a period also corresponding to four periods.

According to the invention, the modulation takes place as below. During the first part P1 of the first modulation signal half-cycle Fs/2, this modulation signal applied to the carrier frequency causes on the latter an amplitude modulation at a rate close to zero (the signal of the carrier is not affected).

During a second part (P2) of a second half-cycle Fs/2 opposite to said first half-cycle (P1), the modulation is such that a negative or equivalent amplitude modulation occurs at a rate greater than 100% and less than or equal to 200%.

Alternatively, the part (P2) of the negative modulation may correspond only to a subpart of this half-period (Fs/2), representing for example half or one third of this half-period. The parts P1 or P2 can therefore extend over all or some of the half-cycles Fs/2.

According to other features, all the negative modulation values lying between 100% and 200% by virtue of phase-difference values lying between 0 and 180° can be advantageous to use according to the communication performance objective, for example equal to 90%, 120%, 150%, 180% or 200%.

In other examples, the negative modulation can generate a phase difference in the carrier frequency that is greater than 0° and substantially less than or equal for example to 90", 135° or 180°, which corresponds to a phase difference of ¼ or ¾ or in phase opposition (½) with respect to the phase of the carrier frequency.

The invention provides for a preferred selection of a negative modulation rate substantially equal to 200% with a phase difference of substantially 180° leading to optimum performance in amplitude of the sidebands.

Figure 9:
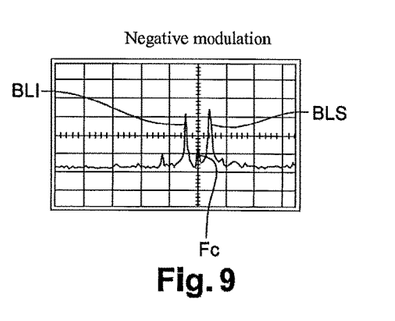

In this configuration, the detected amplitude of the carrier frequency Fc transmitted by the transponder is even at a minimum until it disappears completely or almost totally (FIG. 9).

In the example illustrated in FIGS. 6 and 7, the at least partly negative modulation takes place in the following manner. In the absence of a variation in the modulating signal, the transponder object PICC produces no local carrier (its state is IDLE) as detailed below.

Then, when there is a modulating signal representing a logic low state, the PICC object applies a signal in phase and with a frequency substantially identical to the frequency of the RF field (part MOD A).

On the other hand, when there is a modulating signal representing a logic high state, the PICC object applies a signal out of phase by 180° ($n$) and with a frequency substantially identical to the frequency of the field RF (part MOD B).

Figure 7:
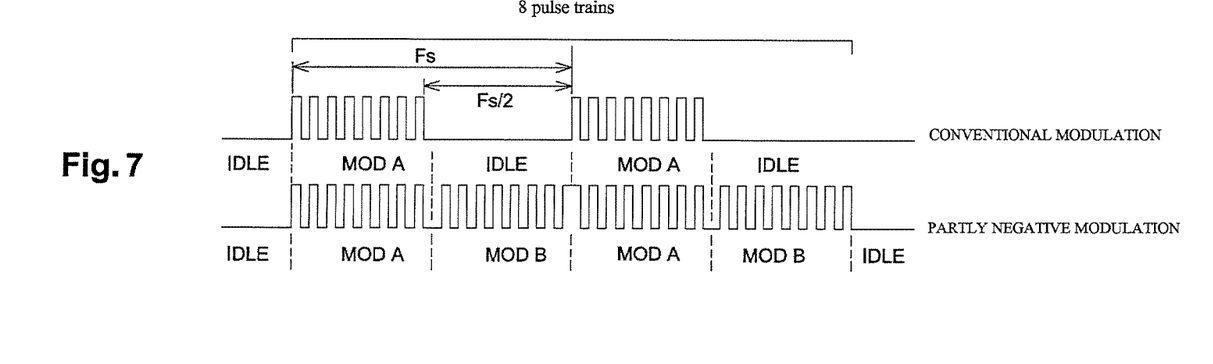
FIG. 7 illustrates a comparison of the modulation according to the invention with respect to a conventional modulation of the prior art.

In the prior art illustrated in the top part of FIG. 7, the conventional modulation produces for this same period an absence of carrier during the second half-period (Fs/2) of a subcarrier period (Fs) of the portable object.

Figure 8:
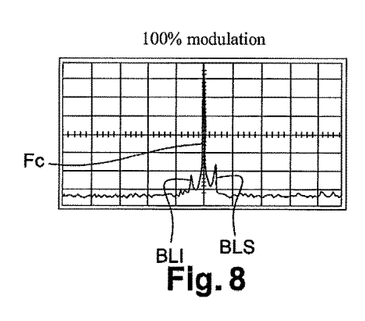
FIGS. 8 and 9 illustrate respectively a comparison between a spectral representation of the sidebands without negative modulation and those obtained by the invention.

The oscillograms and spectral measurements of the sidebands without negative modulation and with negative modulation according to the preferred embodiment of the invention are presented respectively in FIGS. 8 and 9. In FIG. 9, it can be seen that the spectral representation of the modulation proposed by the invention has sidebands that are greater than the maximum amplitude of the carrier frequency.

Figure 18:
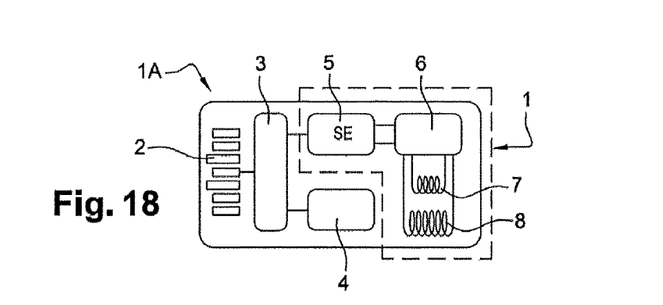
FIG. 18 illustrates an SD card comprising a radio-frequency electronic circuit with activated modulation able to implement, where applicable, the negative modulation of the invention.

A description will now be given in relation to FIGS. 18 to 29 of an example embodiment of the radio-frequency object or circuit with activated modulation able to use the negative modulation principle. This principle can be implemented for example as below in a portable object such as for example here a card to the format of an SD memory card (FIG. 18). The same numbers among the different figures represent identical or similar elements.

According to one feature for this example embodiment, the activated radio-frequency communication method comprises a step of generation or extraction of the carrier frequency by the portable object. The carrier frequency extracted is synchronous with the interrogation frequency of the reader.

Figure 10:
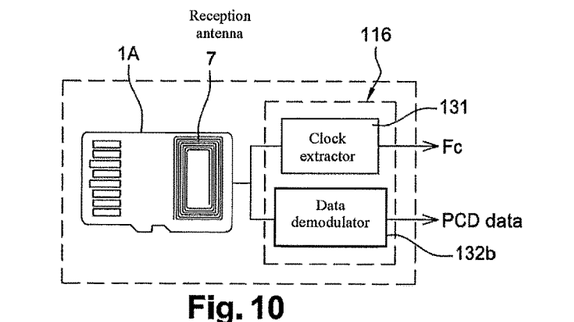
FIG. 10 illustrates a reception circuit part according to one embodiment of the invention.

The signal issuing from a PCD reader (not shown) is picked up in a field SRE by means of a reception antenna 7 of the PICC object 1A (FIG. 10). The structure of this SD card with regard to the contactless communication function is described subsequently. Schematically, the portable object 1A comprises a clock extractor 131 for extracting the carrier frequency and a demodulator 132$b$ for extracting the signals coming from the reader. The carrier frequency Fc and the control signals (PCD data) sent by the reader are taken from the antenna 7.

Figures 19, 20:
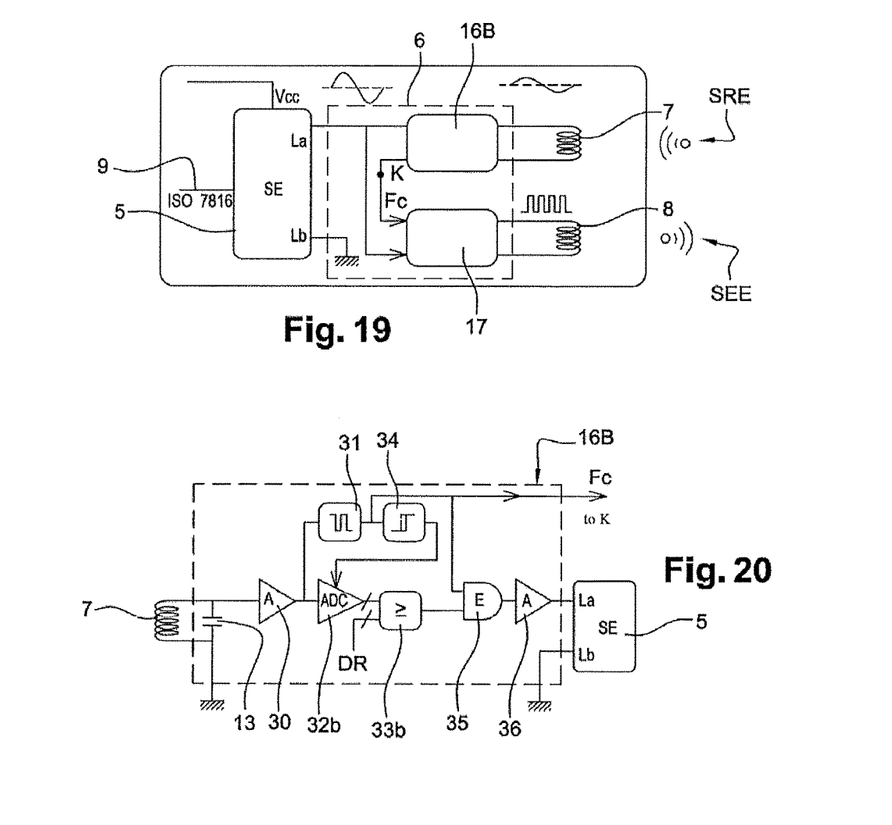
FIG. 19 illustrates a more detailed view of the radio-frequency circuit (1) of the previous figures.
FIG. 20 illustrates an embodiment of a reception stage (16B) of FIG. 19.

The elements 131 and 132 may be identical or similar to the elements 31 and 32$b$ in FIG. 20.

All these extracted signals may be conditioned, in particular amplified, in order to supply to a secure component (SE) the levels and power necessary for functioning thereof. The secure component may for example be a conventional contactless SE chip with dual interface such as the ones in radio-frequency chip cards, as shown in FIG. 19.

The frequency signal Fc is processed in any of the electronic stages of the portable object in order to supply several different phase states, particularly Fc and Fc+II for subsequent use by the modulator 117. Preferably, these states are obtained in the specific stage N described in FIG. 17 subsequently. The stage or circuit N can be inserted in a radio-frequency object with activated communication as described in FIG. 21.

Figure 11:
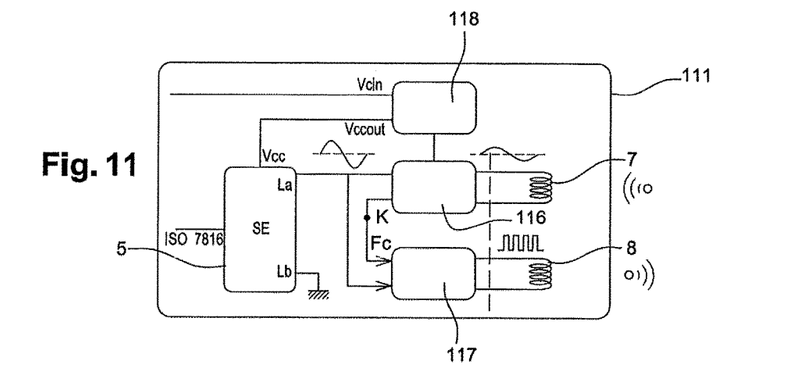
FIG. 11 illustrates a view of a radio-frequency circuit RF according to one embodiment of the invention using a contactless security element SE.

In FIG. 11, the electronic circuit according to an embodiment for activated communication comprises reception 7 and transmission 8 antennas connected respectively to a reception 116 and transmission 117 stage. The reception stage 116 is connected to a chip of the contact and contactless dual interface type (5). The transmission or modulation stage 117 can receive the carrier Fc after extraction in the reception stage 116 via a specific connection via the point K or a bus connecting it to the stage 116. Alternatively, the stage 117 can itself take and extract the carrier.

The circuit 111 (or the card 1$a$ or circuit 1) may comprise a stage 118 for detecting a radio-frequency field connected to a "Vc in" supply that will enable the "Vcc out" supply of the component SE in the presence of an electromagnetic field. The stage 117 is connected to the "La" pin of the component SE so as to receive the response from the component SE. The stages 116 and 117 may be in accordance with the stage 16B of FIGS. 19 and 20 described subsequently having regard to the activated communication circuit 111.

Figure 12:
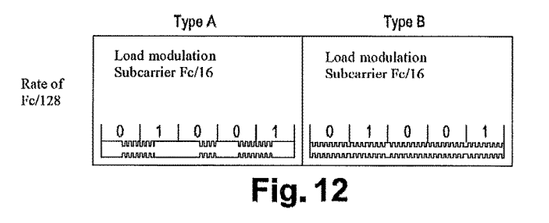
FIG. 12 illustrates the principles of encoding of the charge modulation of type A and type B of the prior art.

The data issuing from the secure component SE are taken from these terminals La and Lb normally designed so as to be connected to a radio-frequency antenna. At these terminals, the message of the portable object PICC or component SE takes the form of a load modulation using in particular two types of encoding of the subcarrier conveying the data. Type A uses a Manchester OOK encoding and type B uses a BPSK NRZ-L encoding as illustrated in FIG. 12.

Figure 13:
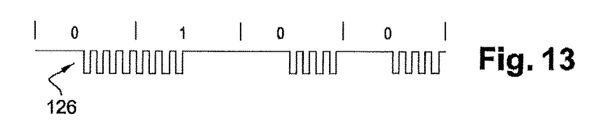
FIGS. 13 and 14 (FIG. 13 enlarged) illustrate a type A message of a portable object demodulated by a specific stage of the radio-frequency circuit of the invention.
Figure 14:
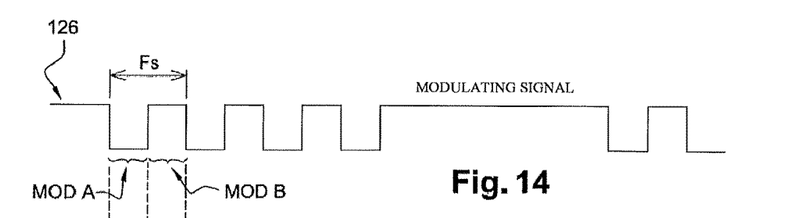

The message from the PICC portable object can be demodulated and conditioned so as to present the low-frequency message from the PICC including a subcarrier. In type A, the encoding 126 is obtained as illustrated in FIG. 13 and enlarged in FIG. 14.

Figure 15:
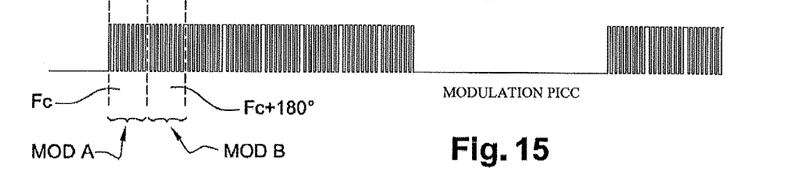
FIG. 15 illustrates the carrier frequency modulated according to the principle of the negative modulation of the invention from the modulating signal of FIG. 14.
Figure 16:
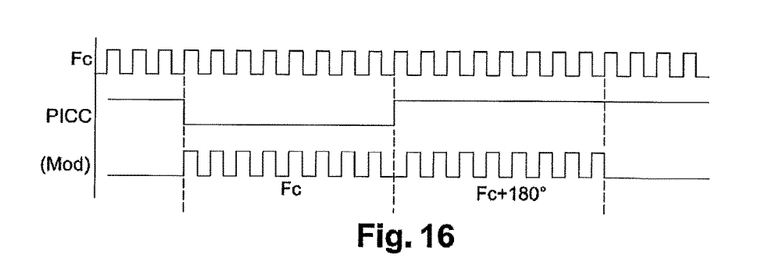
FIG. 16 illustrates a correspondence between the carrier signal Fc, the signal of the portable object (PICC) and the modulation signal (Mod) obtained according to a preferred embodiment of the invention.

This modulating signal 126 is used by a modulator of the stage 117 in order to vary the amplitude and phase of the local carrier frequency Fc in order to effect the negative modulation in accordance with the method of the invention and as illustrated in FIG. 15.

According to one feature of the method of the invention according to this embodiment, the negative modulation is used during all or at least part (MOD B) of a modulation signal. In the example, this part (MOD B) corresponds to half-periods (IDLE) of the periods (Fs) during which the carrier frequency was blocked in the prior art by the modulation.

In one embodiment of this modulation, the modulating signal is reprocessed from the waveform issuing from the load modulation at the terminals La and Lb of the chip SE.

The invention preferably makes provision for distinguishing an absence of variation in the modulating signal (IDLE), from a presence of a modulating signal at the high state (MOD B), these two states being encoded by the same logic high level.

In this preferred embodiment, the method makes provision for performing the following specific operations:
- when there is a signal at the logic low state, the electronic device applies a signal in phase and with a frequency substantially identical to the frequency of the RF field;
- when there is a change from a logic low state to a logic high state, the method applies a signal out of phase by 180° ($\pi$) and with a frequency substantially identical to the frequency of the RF field, for eight carrier periods;
- at the end of the eight carrier periods, the method makes provision for applying a signal at the low state until the next low state of the modulating signal.

Figure 17:
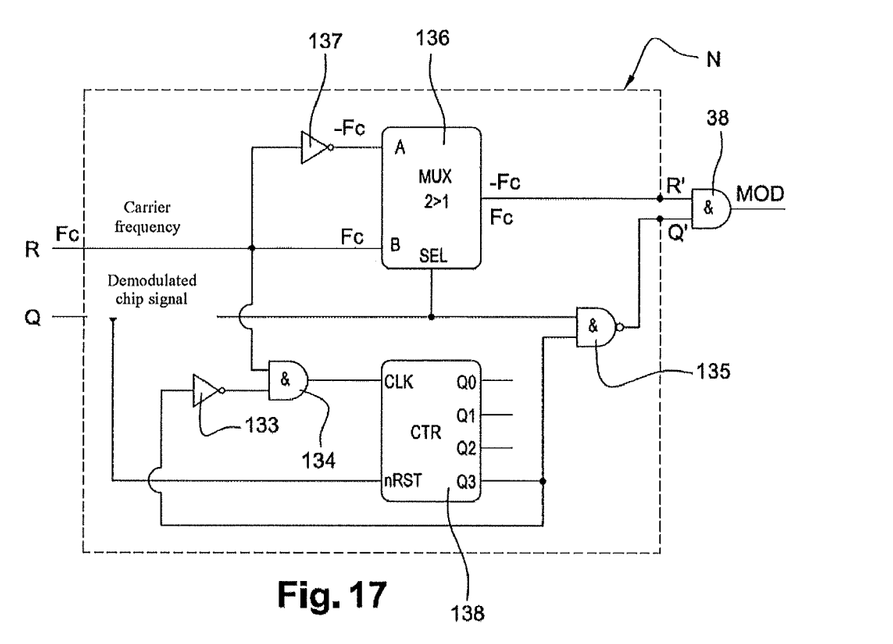
FIG. 17 illustrates an electronic circuit for implementing a preferred embodiment of the method of the invention.

FIG. 17 proposes an embodiment of the negative modulation electronic circuit N implementing the above operations or steps. It comprises mainly a CTR binary counter (138) and a multiplexer MUX (136). The multiplexer receives, at the inputs A and B respectively, firstly the carrier frequency Fc and its inverse (−Fc) for the phase shifting of 180° via an inverter gate 137.

The input "SEL" of the multiplexer receives the signal from the chip SE after having being demodulated.

The binary counter CTR (138) receives, at its clock signal CLK, the output of a logic gate 134 or "AND" function. This "AND" gate 134 receives the signal of the carrier frequency and a counting result issuing from the "Q3" counter and inverted by an inverter gate 133.

A NAND logic gate (135) receives as an input the demodulated signal from the chip and the signal from the "Q3" counter.

The output from the "N" circuit results from an "AND" logic gate 38 receiving firstly the output from the multiplexer (136) and the output from the NAND gate (135) referred to previously. The counter counts the periods of the carrier as explained above.

The circuit functions as explained below. When there is an IDLE or high signal from the chip and a counting state equal to eight, the NAND gate (135) receives a logic high state at its two inputs and delivers a state equal to zero. Because of this no signal leaves the circuit after the "AND" gate.

When the chip emits a low signal (zero), the multiplexer activated by this signal selects the carrier frequency signal Fc supplying an input of the "AND" gate 38 at the end of the circuit. Its other input is supplied by a high state of the NAND gate (135) (since this NAND gate receives a low signal from the chip and a high signal from the counter locked at 1 as a Q3 output).

The result at the output of the circuit is a signal identical to the carrier frequency Fc.

When the signal from the chip switches to the high level (value 1), it causes a resetting of the counter, which counts the periods of the carrier frequency Fc up to 8.

In the meantime, the Q3 signal is reset and the signal at the input of the NAND gate is at the high level (1). The result is a high signal at the input of the "AND" gate (38) at the end of the circuit.

At the same time, the high signal of the chip triggers a selection of a passage of the out-of-phase carrier frequency Fc+180° in the multiplexer MUX and also a passage through the "AND" gate (38) because of the value at "1" on the other input as indicated previously. Because of this, the circuit delivers the signal (MOD) of the carrier out-of-phase by 180° as an output.

When the counter has counted eight carrier frequency periods, the Q3 signal passes to the "high" state, causing an output of the NAND gate (135) equal to the "low" state.

In this state, the circuit ceases to deliver the out-of-phase carrier frequency although the signal from the chip remains at the "high" state.

In the case where the chip has gone to a "low" state at the end of the eight periods, the output of the "NAND" gate would go to a "high" state (since it is supplied by a "high" state of the counter and a "low" state of the chip) and, in this case, the circuit would then allow the carrier frequency Fc to pass normally, until a new high state is presented, which would make the circuit function as indicated previously.

An amplification stage (42) (FIG. 21) next makes it possible, by means of a transmission antenna (43, 8), to transmit this message to the contactless reader (PCD). The features of this stage and those of the transmission antenna may be in accordance with those described.

Figure 21:
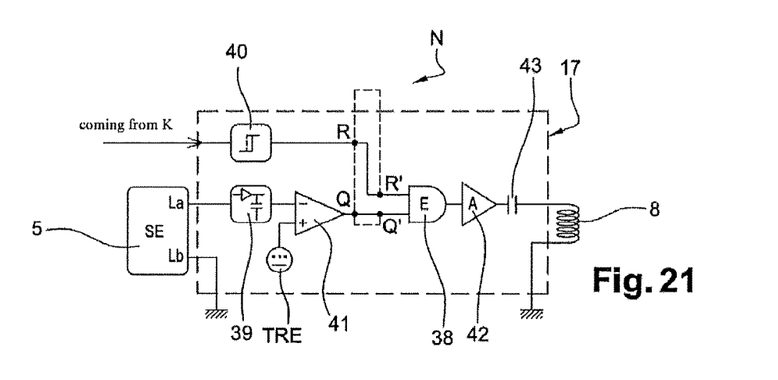
FIG. 21 illustrates an embodiment of an transmission stage 17 of FIG. 19 and, where applicable, an integration of the circuit N for improving communication in this transmission stage (in broken lines)

The invention applies to a communication method and device using an activated communication mode. A description is given below of a portable object "PICC" implementing such an activated communication. The device N described above can be interposed in an electronic stage 17 of an activated-communication portable object as illustrated in FIG. 21.

Activated communication means a contactless communication in which the response of a transponder takes place by emission of an electromagnetic field particular to the transponder, preferably amplified. This emission is in fact obtained by the emission of a given power of a carrier signal modulated by a signal of the transponder.

The amplification and/or operating energy of the sending/receiving transponder is preferably supplied by an external energy source distinct from the reader.

Typically, the contactless communication or circuit of the PICC portable object are in accordance with ISO/IEC 14443 and/or ISO/IEC 15693 or any other protocol relying on an excitation frequency of the electromagnetic field at 13.56 MHz. The circuit is supplied by a current source.

FIG. 18 shows schematically an example embodiment of a contactless communication circuit 1 with activated communication equipping a memory card 1A. However, any other communicating object may in principle be equipped therewith, for example USB key, PCMCIA card, telephone, PDA or computer.

The object may or may not be removable with respect to a host device or be fixed thereto permanently, in particular soldered to a printed circuit card. The circuit or object may where applicable be provided with external antenna connections rather than supporting them.

The memory card 1 comprises, in a known fashion, contact studs 2, a microcontroller 3, and a mass memory (NAND) connected to the microcontroller. The card also comprises a communication processing element 5; this is preferably of the dual interface type (configured to manage a communication of the contact type, for example ISO 7816-3, and contactless ISO 14443 (SE)). This component or element 5 (SE) is preferably protected like an integrated circuit chip known from the chip card field. It may be provided where applicable with cryptographic and/or anti-fraud, anti-intrusion, etc functionalities.

The component SE is connected to the microcontroller 3 by an input/output port. The security component SE is connected to an active interface circuit CL 6. This component 6 receives two antennas 6, 8, respectively reception and transmission.

In its principle, it can be seen that the invention comprises supplementary RF means 6, 7, 8 added to the contactless element SE in order to compensate for the particular small size of the antenna since it is housed in a micro-SD or mini-SD card or in an object of substantially equivalent size.

According to one feature of an embodiment of the invention, the transmission means 5, 6, 7, 8 are configured to modulate a carrier signal 25. This carrier signal here is preferably derived or extracted from the magnetic field received from an external reader.

In the example, the radio-frequency circuit 6 performs functional activities of reception and emission of the electromagnetic field as below. It in particular captures the external radio-frequency field RF coming from a contactless reader in order if necessary to make it compatible with the secure component SE (voltage, etc). It amplifies the response of the secure element SE intended to be listened to by the external reader.

FIG. 19 describes in more detail the component SE (5) and its connections. The circuit SE of this mode comprises means of connection to an external energy source.

In the example, the component SE comprises a contact interface (for example according to ISO 7816, represented by a cluster of connections 9. It comprises a supply pin Vcc, and pins La, Lb connected respectively to an active interface 6 and to earth. The component SE is configured to modulate an impedance load in response to a reception of the frames without contact received on the fins La, Lb.

The active interface 6 comprises a circuit 16B for conditioning the reception signal SRE and a pulse generating circuit 17 for transmitting a transmission signal SEE. Each circuit 16B, 17 is connected to the pin (La) of the processing component 5.

In accordance with one embodiment of the invention, the transmission means 5, 17 are configured to modulate a carrier signal. The carrier signal preferably results from a diversion or extraction of the received magnetic field SRE.

Clock and Reception of Data

According to one embodiment, the method comprises a step of receiving the carrier frequency generated by the reader. The carrier frequency is received by a dedicated reception antenna 7. The antenna 7 in fact receives the electromagnetic field emitted by the reader comprising the modulated carrier frequency. The frequency is in the example 13.56 MHz but could be any other according to the type of communication or protocol relying on this frequency of 13.56 MHz with a short or medium range less than in particular 10 m, 1 m or 0.1 m or even close to 0.

However, the invention does not exclude generating a carrier signal otherwise for example from a clock signal or an internal signal of a host device or of the object, a synchronisation device will be necessary to slave the internal clock to that of the external magnetic field, for example by means of a PLL. In this embodiment, a single coil could be used as an antenna, both receiving and transmitting. A switching circuit will be able to transform this stage into a reception stage consisting of:

a parallel resonant circuit for reception
a serial resonant circuit for transmission.

The two resonant circuits being formed from the same coil.

This reception step also has as its objective collecting the data sent by the reader to the contactless object. An electronic stage comprising a dedicated reception circuit can be produced for this purpose, in particular to adapt the voltage.

The method can also use a step of adaptation through a reception adaptation stage (16B) for adapting the reception signal SRE to chip 5. The method can, cumulatively or alternatively, effect in this stage an extraction of a synchronised carrier signal 25 of the reception signal SRE.

FIG. 20 illustrates a detailed embodiment of the stage 16B. The reception stage 16B comprises the reception antenna 7 here connected to the pin "La" of the chip via a reception circuit described below.

The signal received by this antenna can be amplified before extraction of the clock signal corresponding to the signal of the carrier. For this purpose, the circuit comprises an amplifier 30 connected to the antenna and a clock extractor 31 is connected to the output of this amplifier.

The clock signal 25 obtained at the output of the extractor is sent by a connection (K) to a pulse generating circuit or transmission adaptation stage 17 detailed in FIG. 21. The output of the clock extractor 31 is moreover also connected to a logic circuit 35 performing an "AND" function.

The stage 16B here comprises also an analogue to digital converter 32b receiving the reception signal SRE amplified by the amplifier 30 connected to a comparator circuit 33b for comparing the demodulated signal obtained with a digital reference voltage value (DR).

Next, the output signal of the digital comparator 33b is combined with the clock signal 25 coming from the clock extractor 31 at a component 35 performing a logic "AND" function. A first arm of the output of the component 35 can pass through an amplifier 36 before being injected into the pin "La" of the chip 5.

As an alternative arm of the output of the component 35 can pass through an inverter gate and then an amplifier 36 before being connected to the pin "Lb" of the chip.

The pin "Lb" is here connected to earth.

In a variant, the clock extraction circuit 31 can also be connected to a phase shifter 34 before acting on the analogue to digital convertor 32b.

The reception circuit or stage 16B is firstly connected to the reception antenna 7 connected here to the pin "La" of the chip. The circuit 16B can comprise a capacitor 13 placed at the terminals of the pins "La" and "Lb" of the chip. This capacitor makes it possible to have a good quality factor. The resonant circuit of the reception antenna 7 is produced on the principle of a parallel circuit.

In addition, this circuit comprises a phase shifter 34 on an output arm of the clock extractor 31. This phase shifter is next connected to the analogue to digital converter 32b.

Thus this stage 16B makes it possible to extract the clock signal 25 and to adapt the signal to the chip 5. After reception and amplification, the carrier signal is directed to the RF input of the Combi chip 5 using the interface pins La/Lb. A supplementary capacitor 18 can be added to the interface in order to match the input impedance.

The electronic stage 16B functions as follows:

The signal SRE received by the antenna 7 may be fairly low because of the small coupling surface of the antenna 7 in a support such as an SD minicard.

This signal is amplified by the amplifier 30 before being demodulated by the analogue to digital convertor 32b. A useful signal extracted and calibrated by the comparator 33b is combined by the AND gate 35 with the clock signal 25 extracted by the clock extractor 31. At the output of the gate 35, the reconditioned radio-frequency signal is injected into the component 5 while first being amplified by means of the amplifier 36.

At the same time, the supply Vcc of the chip on the ISO 7816 contact side can be deactivated by a suitable circuit (not shown) while there is an SRE electromagnetic field present. The latter circuit may be included in the circuit 16B. The actuation may be manual.

The latter may preferably have their components (30, 36, 32b etc) supplied with voltage by a supply coming from the contacts 2 connected to a host device.

The phase shifter 34 precisely regulates the triggerings acquiring the radio-frequency signal in order to convert the envelope of the received signal into a digital signal by the convertor 32b.

The "Combi" chip 5 can be supplied by its IS.IEC 7816 Vdd and Vss contact pins and may or may not use energy procured for it by the field according to the use and electronic circuit of the invention. The chip can also be supplied by voltage that would be generated like the RF field or by the circuit 16B itself that would be supplied by the contacts 2 of a host device.

The advantage of the latter option is for the component 5 to have its supply managed by the stage 16B according to the presence of not of the field and where applicable reinitialising the chip 5.

At this stage, the voltage amplitude VLab is at least 3.3 Vpp (volts peak-to-peak). This value is necessary so that the chip of the example detects the 13.56 MHz clock and can extract data coming from the reader.

By way of example, the following table indicates the voltage required by two current chips, for example P5CD072 from Philips/NXP or 66CLX800 from Infineon for detecting the clock and the data coming from an external field.

| Chip | Contactless chip Vcc = 3 V | Contactless chip Vcc = 2.7 V |
| --- | --- | --- |
| Vmin (Vpp) | 3.48 | 3.53 |
| Vmax (Vpp) | 6.87 | 6.22 |
| Duty Cycle (%) | 7.7 | 7.7 |

Figure 22:
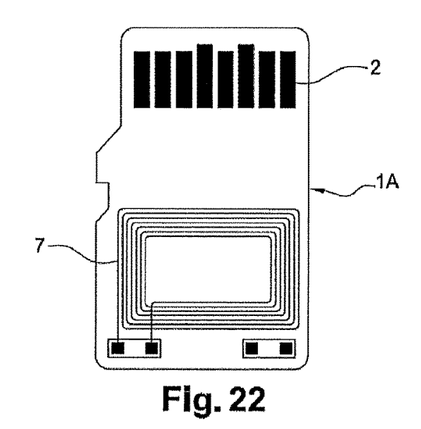
FIGS. 22 and 23 illustrate a reception antenna arranged with respect to a micro-SD card and equivalent circuit values of the antenna.
Figure 23:
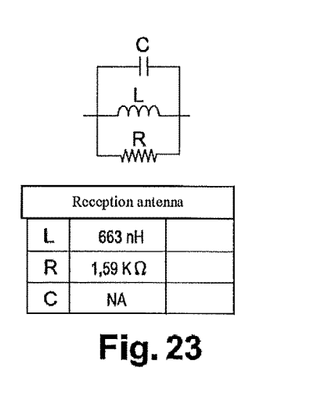

Reception Antenna (FIGS. 22, 23)

The size of the reception antenna 7 is as large as possible within the limit of the surface area available in the object. In the context of an available surface on an SD micro-card, the results below were adopted. The inductance is preferably selected so as to be tuned by a supplementary capacitor with low capacitance in order to limit the size of the capacitor.

The reception antenna may for example have a 5×5 mm² surface and comprise 4 to 6 turns. The antenna may be tuned to 13.56 MHz with a quality factor Q of 10. A parallel circuit may be selected so as to obtain a maximum voltage at the terminals of the antenna circuit. The following antenna characteristics were selected with the equivalent circuit of FIG. 25 with L: 663 nH and R: 1.59 kΩ; C not being applicable.

Figure 25:
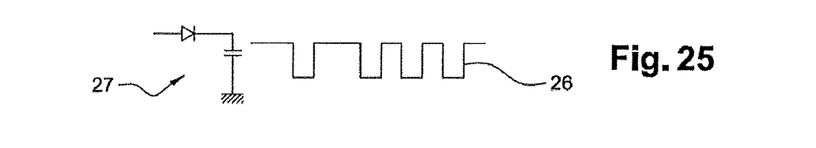
FIG. 25 illustrates a filter extracting the response signal of the component 5 from the carrier of the previous figure.

The performances of the antenna measured with such an antenna with the equivalent diagram of FIG. 25 are given in the following table.
Ls=663 nH; Rs=1.59 kΩ; C1=180 pF;
C2=19 pF; Rc=270 kΩ; Cp=9.5 pF; Rp=1 MΩ

| Intensity of field | Contactless chip Vcc = 2.7 V |
| --- | --- |
| 1.5 A/m | 1.01 Vpp |
| 4.5 A/m | 3.00 Vpp |
| 7.5 A/m | 5.09 Vpp |

The expected voltage of this antenna is greater than 1 Vpp (volts peak-to-peak). The minimum field creates a voltage greater than 1 Vpp, not enough for the Combi chip 5 to detect the signal. This is why, in the example embodiment with an SD micro-card, an amplification stage has preferably been introduced. This amplification stage for receiving the clock is here greater than 10 dB, the voltage gain being equal to 3. This amplification may not be necessary in other circumstances or other chips.

The output level of the conditioning stage 16B is between 3 Vpp and 14 Vpp. The gain may be between 5 and 20 dB.

The supply cutoff of the chip or the RESET function may be triggered also by any means, such as a switch in the host device or on the chip supply circuit. The chip is automatically reinitialised when it is powered up.

Figure 24:
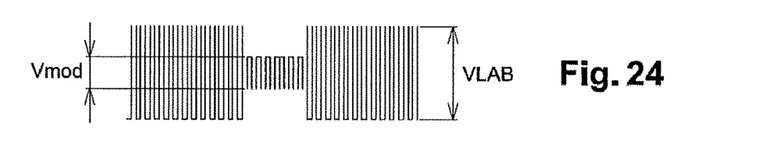
FIG. 24 illustrates a modulation level by the radio-frequency component SE (5)
Figure 26:
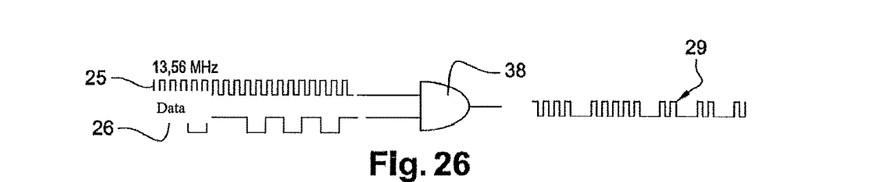
FIG. 26 illustrates schematically a circuit combining the carrier and the response signal alone.
Figure 27:
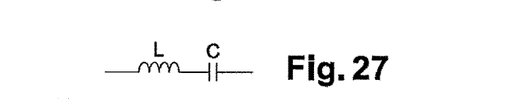
FIG. 27 illustrates an LC circuit relating to the transmission antenna of the radio-frequency circuit with activated communication.

Sideband and Modulation (FIGS. 24-26)

In the example (FIG. 26), when the combi chip 5 receives the carrier signal 25 (or the carrier) as well as the data signal 26, by means of its pins La/Lb, it generates a load modulation signal in order to transmit a response to the device or terminal in communication with it. The amplitude of the modulation device Vmod is here approximately half the amplitude of the carrier VLAB when the capacitor is well matched.

A capacitor of 10 to 60 pF at the terminals of the points La, Lb of the chip can be used for this purpose. This value may vary according to the type of chip. Thus the voltages VLAB and Vmod equal respectively to 3.3 volts peak-to-peak and to 1.6 volts peak-to-peak are obtained.

At this step, two options are envisaged. The first, more simple, is to use this signal as it is presented and then preferably to amplify it in a high-power amplification station in order to inject the signal into a circuit for matching or activating the transmission 17 before the transmitting antenna 8. Various amplification means known to persons skilled in the art can be used.

In another example (FIG. 26) according to a second option, the carrier signal for transmission is omitted in order to keep only the numerical data 26. For this purpose, it is possible to use for example a low-pass filter 27 in FIG. 25.

Subsequently (FIG. 26), a modulation of preferably 100% is effected by combining the data signal 25 with a carrier 26 at 13.56 MHz. This may be done by means of the logic AND gate 38 or an amplifying buffer 42 or a transistor circuit performing the same function. After a power amplification, the signal 29 obtained is used for supplying the output antenna 8.

Thus, rather than amplifying the assembly comprising the carrier 25 and the signal 26 or the carrier 25 alone even when there is no signal, the invention makes provision for amplifying the signal and the carrier only when there is a response signal. For example, here in FIG. 26 the useful signal 29 is amplified when the data signal is at a high level. When there is no signal (data line at a zero or close to zero level), no signal leaves the gate 38. There is no amplification and unnecessary loss of energy of the carrier alone before supplying the transmission antenna.

FIG. 21 illustrates a preferred relatively simple optional embodiment for obtaining good results and partly implementing the second option. According to this preferred option, the matching stage 17 comprises a logic AND gate 38 or equivalent circuit for combining a carrier signal 26 (FIG. 26) and a response signal 25 or transmission of the chip 5 before amplification.

In more detail in the circuit 17, the pin "La" of the chip 5 is connected to a demodulator 39 (which may be of the same type as the circuit 27 or 32b) in order to receive a modulated response signal from the chip 5. Next, the output of the demodulator 39 connects a comparator 41 that compares the voltage level received with a reference voltage level (TRE) in order to digitise the useful signal. The output of the comparator 41 carrying the useful response signal from the chip 26 is connected to one of the inputs of the component 38 performing the logic AND function in order to combine the carrier signal 25 with the response signal 26 from the chip.

The carrier 25 comes from the point K on the reception and extraction adaptation stage 16B. The carrier is injected via a connection to the other input pin of the component 38 fulfilling the logic AND function. The clock signal is preferably shifted in phase by a phase shifter 40 so as to synchronise or fix the clock signals optimally with the carrier of the radio-frequency signal generated by a reading device in order to produce a maximum retro-modulation.

The circuit 17 preferably comprises a buffer circuit or amplifier 42 for amplifying the signal 29 output from the component 38 before injecting it into the transmission antenna 8. The antenna circuit used forms, with a capacitor 43, a serial resonant circuit.

Some components of the stage 17 may preferably be supplied with voltage, for functioning thereof, by an energy source coming from the host device via the contacts 2. Other sources known to persons skilled in the art are not excluded.

The circuit 17 functions as below. After the chip has received, on its points La, Lb, radio-frequency frames SRE preferably previously reconditioned, the response of the chip by load modulation is received and demodulated in the demodulator 39. Then a useful signal is digitised by the threshold comparator 41 before being injected into the AND circuit 38 and combined with a carrier 25 extracted or derived from the received field SRE coming from the point K. Where applicable, the circuit 17 may comprise a clock extractor similar to 31 taking off the signal as at the parts 16B in broken lines.

The response signal 29 resulting from the circuit 38 is then amplified preferably by the amplifier 42 before being injected in into the serial-resonance transmitting antenna 8.
Power of the Output Buffer Amplification So as to compensate for the small surface area of the transmitting antenna in the SD card (or other substrate), it is possible to use an output buffer amplifier 42 that preferably delivers a minimum current ranging from 60 to 80 mA at the supply voltage provided. Good results are obtained with a power greater than 200 mW.

An advantage of this treatment is in particular to limit the energy consumption at the amplification when there is no response signal from the chip 5. It is in fact unnecessary to amplify the signal of the carrier alone when there is no response or signal to be sent in the application envisaged.
Output and Frequency Tuning Antenna (FIGS. 28, 29)

The antennas 7, 8 comprises in the example turns arranged flat on the same substrate (or two separate substrates) as illustrated in the figures in particular 22 and 29. Any means of producing an antenna known to persons skilled in the art may be used, such as etching, ultrasonic wire embedding, etc.

When the system is supplied by a low voltage (3.3 V), the output antenna is designed so as to produce a serial resonance. When the system is supplied by a strong current, the voltage between the total LC circuit will be relatively small, when a high voltage is present on each component L and C.

Figure 28:
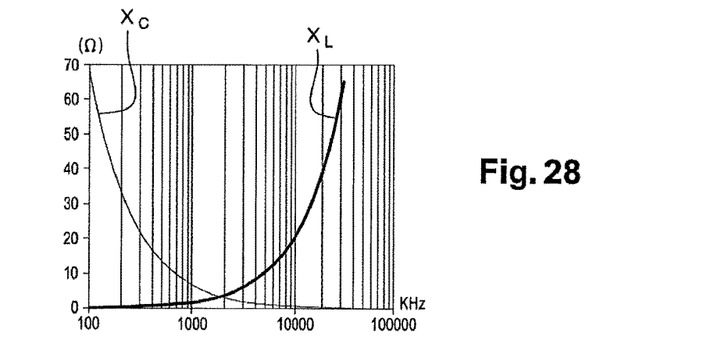
FIG. 28 illustrates values of the reactances $X_L$ and $X_C$ from respectively the inductance and the capacitance according to the frequency.
Figure 29:
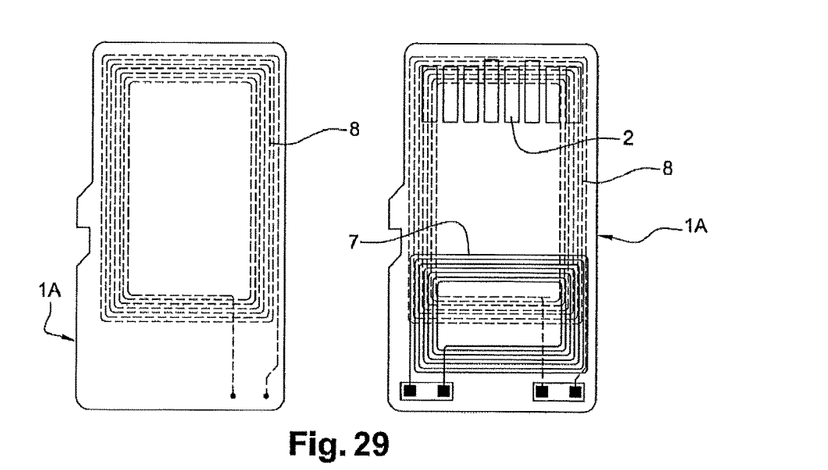
FIG. 29 illustrates an arrangement of a transmission antenna 8 for a micro-SD card equipped with a radio-frequency circuit with activated communication and an arrangement of two antennas with each other.

The curve illustrated in FIG. 28 represents obtained reactance values XL as a function of the inductance and thus reactance values XC as a function of a capacitor according to the frequency in application of the following formulae.

$$X_C = \frac{1}{2 \cdot \pi \cdot f \cdot C}$$

$$X_L = 2 \cdot \pi \cdot f \cdot L$$

At the point of intersection between the two curves, the reactances XL and XC are equal. F is the serial resonant frequency of the circuit.

At this point, the voltage at the terminals of the circuit LC (FIG. 27) is at a minimum when the intensity of the current is at a maximum. As the magnetic flux is directly dependent on the current, this serial resonance is a means of creating a high magnetic field on the transmitting antenna 8 although it is supplied by a low voltage.

This constitutes a means of increasing the power of the transponder signal 5 despite the small size of the antenna on the substrate.
Characteristics of the Transmission Antenna (FIG. 29)

According to the embodiment of the invention, the circuit comprises separate reception and transmission antennas. The antennas are arranged between them so that their mutual inductance is at a minimum or at least partly cancels out. Preferably, the arrangement is chosen so as to have a minimum current injection in the reception antenna in particular less than a gain threshold of the reception stage 16B. For example, with a gain of 3 provision is made for arranging the antennas with each other so as to have a voltage less than 300 mV.

In a variant (not shown), the antennas are protected from each other by being separate from each other and/or by shielding.

In another variant, the antennas overlap and electronic protection means are provided such as filters configured so as to prevent mutual interference.

In the advantageous embodiment, the size of the transmitting antenna 8 is greater than the reception antenna. The antenna is for example situated on the rear side of the μSD as illustrated in FIG. 29. Its characteristics used in the example are: L=1.05 μH; R=939Ω; C=2.69 pF.

In order to avoid crosstalk between the antennas because of inevitable coupling between them, the antennas are arranged so that the mutual inductance between the two antennas is reduced to a minimum. Various solutions are possible, in particular isolating one antenna with respect to the other, deactivating one antenna while the other is active and vice versa.

According to a preferred embodiment, this feature of minimised mutual induction is obtained by overlapping or superimposition of the two antennas. The reception antenna 7, larger in the example, is arranged so as to have substantially a part placed outside the external periphery of the transmission antenna. Preferably the reception antenna 7 is substantially mounted half straddling on one side and inside the periphery of the transmission antenna 8 and half outside the periphery of the transmission antenna.

Thus, by virtue of this particular arrangement, there are two antennas where the resultant of the mutual inductance is overall zero or at least minimised.

When the transmission antenna emits an electromagnetic field, part of the flux F passes in a direction X through a part A of the antenna 7 situated opposite the inside of the transmission antenna 8 generating an induced current (i) in the antenna 7. At the same time, another part of the flux F passes through a part B of the antenna 7 situated outside the surface of the transmission antenna 8 in a direction Y opposite to X generating an induced current (j) opposite to (i).

Thus, by a partial overlap of the antennas, at least the value of an interference caused by the transmitting antenna 8 on the receiving antenna 7 is reduced.

The interference caused in the receiving antenna by the transmitting antenna is cancelled out by itself at least to a major extent. The resultant may be substantially overall zero according to the appropriate positioning of the antennas and their characteristics.

The efficacy of self-cancellation may depend on the immediate environment external to the antenna such as for example the metal environment of a telephone or host device of the object 1. The antennas may be on the same face of a substrate while being isolated from each other or on opposite faces. The antennas may also be arranged on separate supports parallel to each other.

The activated communication circuit can make provision for using elements and the advantages described below:
  Means of recovering or extracting the carrier of the magnetic field received to enable an active modulation function without oscillator with conventional contactless chips (non-NFC);
  an arrangement of separate antennas with zero or almost zero mutual inductance simplifying the circuit;
  the use of two kinds of resonance (preferably of the parallel type for reception) and preferably of the serial type for transmission for better efficiency;
  a level-adaptation circuit 16B connected to the combi chip 5 enabling the existing chips to be used, and in particular dual-interface chips (combi bank) that are already certified and with no modification for simplification and for industrial convenience. In particular, provision is made for the use of the La/Lb antenna interface of the existing combi chip (in particular from Infineon SLE 66CLX800PE) for modulating/demodulating;
  in addition, the invention dispenses with the use of a chip or component of the NFC type with in particular an integrated oscillator. For example, a contactless chip complying with ISO/IEC 14443 and/or ISO/IEC 15693 may be used;
  the circuit may comprise a detector configured to supply a signal representing the presence of an external magnetic field and triggering an operating mode from at least one contact mode and contactless mode;
  in a variant, one or other or both of the antennas of the circuit may already be integrated in a host device, the circuit of the invention without the antennas simply being connected to one of the antennas via a connector (not shown) for more adaptability of the circuit to host devices.

The activated communication circuit applies to any communication device or equipment comprising the circuit described above, whether it be in removable form or not.

The invention claimed is:

1. A method of radio-frequency communication between a contactless transponder and a reader, in which at least one sideband of a carrier frequency is used for communicating a response from the transponder by modulation of an amplitude of the carrier frequency,
  wherein the modulation comprises:
    controlling amplitude modulation with a modulation signal, wherein the modulation signal contains portions of logic high levels and portions of logic low levels, and
    wherein the modulation signal has a frequency of a subcarrier of the carrier frequency,
    wherein, during at least part of the time when the modulation signal is at one of the logic high and logic low levels, applying amplitude modulation to the carrier frequency at a level close to zero such that the amplitude of the carrier frequency is not affected, and
    wherein, during at least part of the time when the modulation signal is at the other of the logic high and logic low levels, applying amplitude modulation to the carrier frequency in such a way that the amplitude level of the carrier frequency is different from the amplitude during the one logic level, and
  applying a phase shift to the carrier frequency prior to the amplitude modulation.

2. A radio-frequency communication method according to claim 1, further comprising:
  a step of generation or extraction of the carrier frequency by the transponder, said carrier frequency being synchronous with an interrogation frequency of the reader.

3. A method according to claim 1, wherein the transponder generates a modulation signal at the subcarrier frequency, the modulation of the amplitude of the carrier frequency generating at least one of said sidebands.

4. A method according to claim 1, wherein the modulation during at least part of the other logic level is at a level greater than 100% and less than or equal to 200% of the amplitude of the carrier frequency, and generates a phase shift in the carrier frequency greater than 0° and less than or equal to 180°.

5. A method according to claim 4, wherein said modulation during said other logic level of the modulation signal is substantially equal to 200% and the phase shift is substantially equal to 180°.

6. A contactless communication circuit for establishing a communication between a contactless transponder and a reader comprising an antenna, said circuit being configured to generate at least one sideband of a carrier frequency and to use it for communicating a response from the transponder by modulation of an amplitude of the carrier frequency, wherein the circuit is configured to at least partly apply the modulation with a modulation level greater than 100% of the amplitude of the carrier frequency, said circuit comprising:
  a stage for reception of a field emitted by the reader,
  a stage for extracting the carrier frequency of the received field,
  a carrier frequency processor configured to perform:
    one or more phase shifts of the extracted carrier frequency with a phase shifter,
    modulation of the amplitude of the extracted, phase-shifted carrier frequency with a modulator,
  a stage for amplification of the modulated signals with an amplifier, and
  a stage for transmitting the amplified signals with an antenna.

7. A circuit according to claim 6, comprising a logic gate for distinguishing a modulation signal, said logic gate being configured to distinguish between an absence of a message to be sent during a logic high state and a message content at the same logic high state.

8. A circuit according to claim 7, wherein the logic gate is implemented by a counter.

9. A circuit according to claim 7, comprising a counter for maintaining 8 carrier periods before returning to a logic low state, until a subsequent logic low state of a modulating signal, at an end of the message to be sent.

10. A circuit according to claim 6, comprising a first data reception antenna and a second data transmission antenna, said first and second antennas being separate from each other.

11. A circuit according to claim 6, wherein a matching stage fulfills a logic AND function in order to combine a carrier signal at the carrier frequency and a response signal before amplification.

12. A circuit according to claim 10, wherein the reception antenna forms part of a parallel resonant circuit and/or the transmission antenna forms part of a serial resonant circuit.

13. A circuit according to claim 6, comprising a contactless transponder comprising a contactless chip configured to receive a reception signal and the circuit comprises a reception adaptation stage arranged to adapt the reception signal to the chip and/or to extract a synchronised carrier signal from the reception signal.

14. A circuit according to claim 6, comprising a detector configured to supply a signal representing presence of an external magnetic field and triggering an operating mode from at least one contact mode and contactless mode.

15. A communication device comprising or incorporating the circuit according to claim 6.

16. A communication device of claim 15, wherein the circuit is removable from the device.

17. A communication device according to claim 15, wherein said device comprises one of a card, a proximity integrated circuit card, a micro card, a printed circuit card, a USB key, a PCMCIA card, a mobile telephone, a PDA, or a computer.

18. A method of radio-frequency communication between a contactless transponder and a reader, in which at least one sideband of a carrier frequency is used for communicating a response from the transponder by modulation of an amplitude of the carrier frequency, comprising performing an active radio frequency communication by:
   generating or extracting, within the contactless transponder, said carrier frequency, and
   applying, by the contactless transponder, modulation at a rate greater than 100% to at least part of the generated or extracted carrier frequency.

19. A method of radio-frequency communication between a contactless transponder and a reader according to claim 18, wherein said modulation at a rate greater than 100% induces a phase shift in the generated or extracted carrier frequency.

20. A radio-frequency communication method according to claim 18, wherein:
   the generated or extracted carrier frequency is synchronous with an interrogation frequency of the reader, and
   said modulation at a rate greater than 100% is performed during at least a part of a half-cycle of a modulation signal, and modulation at a rate less than 100% of said amplitude is performed during the other half-cycle of the modulation signal.

21. A method according to claim 18, wherein the transponder generates a modulation signal at the subcarrier frequency, the modulation of the amplitude of the carrier frequency generating at least one of said sidebands.

22. A method according to claim 18, wherein the modulation of the amplitude of the carrier frequency comprises at least one period or a plurality of periods, and the step of applying modulation at a rate greater than 100% comprises:
   modulation with a level close to zero, during a part of a first modulation signal half-cycle, and
   modulation at a rate greater than 100% and less than or equal to 200% of said amplitude during a part of a second modulation signal half-cycle.

23. A method according to claim 18, wherein the modulation at a rate greater than 100% generates a phase shift in the carrier frequency greater than 0° and less than or equal to 180°.

24. A method according to claim 23, wherein the rate of said modulation is substantially equal to 200% of said amplitude and the phase shift is substantially equal to 180°.

* * * * *